United States Patent [19]
Meuser et al.

[11] Patent Number: 5,263,838
[45] Date of Patent: Nov. 23, 1993

[54] TURKEY CALLER CONTAINER

[76] Inventors: Donna E. Meuser, 2512 Hillsboro Valley Park Rd., High Ridge, Mo. 63049; John S. Moore, 71 Sherman--West, St. Louis, Mo. 63125

[21] Appl. No.: 822,075

[22] Filed: Jan. 17, 1992

[51] Int. Cl.$^5$ .............................................. A45F 5/00
[52] U.S. Cl. ..................................... 224/191; 224/250; 206/315.11
[58] Field of Search ............... 150/154, 161, 162; 206/314, 315.11; 224/191, 250, 253, 901, 910, 202

[56] References Cited
U.S. PATENT DOCUMENTS

| | | | |
|---|---|---|---|
| 3,701,371 | 10/1972 | Stackhouse | 224/913 |
| 3,973,776 | 8/1976 | Ogle | 224/211 |
| 4,420,104 | 12/1983 | DiIenno | 224/250 |
| 4,674,787 | 6/1987 | DeVera | 150/154 |
| 4,759,963 | 7/1988 | Uso, Jr. et al. | 224/901 |
| 4,838,466 | 6/1989 | Holmstrom | 224/250 |
| 5,104,076 | 4/1992 | Goodall, Jr. | 224/901 |
| 5,111,981 | 5/1992 | Allen | 224/202 |

*Primary Examiner*—Jimmy G. Foster

[57] ABSTRACT

This invention relates to a container for turkey callers having a body of flexible material with a first end portion adapted to overlap a second end portion to provide a container for storage and transportation of a turkey caller. The first end portion and a second end portion are adapted to be reversed and folded and held in place with a strap to expose the turkey caller for instant use when the container and turkey caller are in place on the front of a hunter.

1 Claim, 3 Drawing Sheets

TURKEY CALLER CONTAINER

FIELD OF THE INVENTION

This invention relates to a carrier for mechanical turkey callers whereby the turkey caller is maintained in position on the turkey hunter with minimum exposure and instant availability.

BACKGROUND OF THE INVENTION

Hunting turkeys for food and sport has been practiced from the beginning of time. Wild turkeys are known to be wiley and difficult to kill. Turkeys are known to have exceptionally keen hearing and eyesight and are difficult to approach in the wild. Therefore wild turkey hunters attempt to duplicate the mating call of turkey hens in order to attract gobblers. Certain wild turkey hunters have become quite skilled at creating sounds which imitate the call of the hen turkey. In more recent times, mechanical devices have been developed which are unbelievably accurate in duplicating the call of the hen turkey when used by a skilled turkey hunter.

SUMMARY OF THE INVENTION

This invention relates to a carrier for turkey callers which make the turkey caller easily and quickly available to the hunter. Many different turkey callers are presently available on the market. Such commercial turkey callers include turkey callers made and marketed by Primos Wild Game Calls, Inc., Ben-Lee Calls Company, Quaker Buy, Inc., Perfection Turkey Calls, Moss Doubletone, Inc., Lynch Manufacturing Company, Ashby Manufacturing Company, True-Tone Manufacturing Company, Penn Woods Company, and M. L. Lynch Co. An excellent turkey caller is identified as World Champion, marketed by M. L. Lynch Co., Liberty, Miss. These instruments are each unique and delicate and therefore easily damaged. Any misalignment of the instrument distorts the turkey call. It is not easy to create an instrument which duplicates the call of a hen turkey calling for the gobbler. Turkey gobblers are known to be very astute at distinguishing the real call from an imitation. Also, a good mechanical turkey caller is rather expensive. Although the turkey caller, per se, is not part of this invention, a unique part of the present invention involves a turkey caller carrier or container which protects the turkey caller while making it quickly and immediately available to the turkey hunter. Further, since mechanical turkey callers involve mechanical action between two parts, generally in rubbing relationship, and always with a powdery substance between the working parts, the carrier must be made so that it can retain the turkey caller in the correct position but at the same time provide for sufficient looseness between the turkey caller and the carrier to allow the mechanical action to create the proper effective duplicate of the call of the hen turkey. Also, the carrier must be constructed in a manner which provides for quick adjustment which must be completed prior to starting the turkey hunt.

The turkey caller container of this invention includes a body of flexible material having a first end portion adapted to overlap a second end portion to retain and protect the turkey caller when not in use. The respective end flaps are adapted to be separated and folded back to expose the turkey caller so that it can be utilized with minimum movement and minimum exposure and so that it may be operated with one hand, leaving the other arm available for carring a weapon.

More specifically, the container of this invention includes a base upon which the turkey caller rests. Extending from each side of the base are a pair of side flaps which are at substantially right angles to the base when in place about the turkey caller.

Extending from and attached to one of the side flaps is an elongated strap adapted to hold the container in place on a turkey hunter.

Extending from and attached to the respective side flaps are a pair of overlap flaps. A first overlap flap includes a Velcro separable fastener strip on the outer surface which is adapted to overlap and mate with a Velcro separable fastener strip on the inner surface of the second overlap flap. When it is desired to retain the turkey caller in the container for storage or transportation the overlap flaps are locked in place over the top of the turkey caller.

The respective overlap flaps are adapted to be folded back in adjacent and parallel relationship with the respective side flaps in order to expose the turkey caller for instant use. When the first overlap flap is reversed, the Velcro separable fastener strip will be adjacent to the outer portion of the first side flap and therefore holds the first overlap flap in close parallel relationship with the first side flap. When the second overlap flap is reversed and folded it will be in close parallel relationship with the second side flap, and held in position by a Velcro separable fastener strip on the outside of a container and by engagement with the elongated strap.

The enlongated strap is attached to the second side flap and adapted to pass through belt loops in a hunter's trousers and lap around the container. The elongated strap has a strip of Velcro separable fastener material attached to the inner portion thereof and adapted to mate with the exposed Velcro separable fastener strip on the second overlap flap, thus retaining the turkey caller in exposed position and available for instant use by the hunter. The elongated strap will be long enough to traverse the container body and attach to a Velcro separable fastener strip on the back of the elongated strip near where it attaches to the second side flap. Preferably, this Velcro separable fastener strip extends on across the back of the second side flap to hold the second overlap flap in position when it is reversed and folded in place to expose the turkey caller for instant use.

BRIEF DESCRIPTION OF THE DRAWINGS

In the following detailed description.

DETAILED DESCRIPTION OF THE PREFERRED EMBODIMENTS

Figure 1:
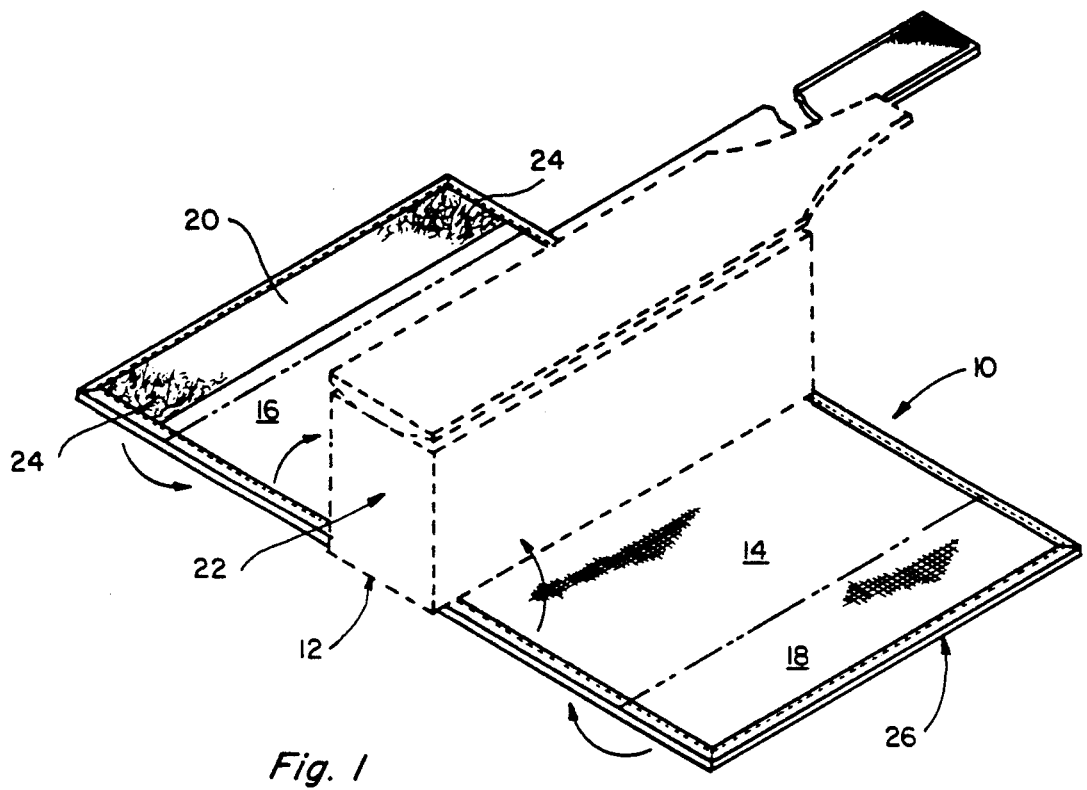
FIG. 1 is a perspective view of the container of this invention with the turkey caller in phantom.

In the following detailed description of the invention, the same numbers are used to identify the same parts in the several figures. FIG. 1 shows container 10 which includes base 12 with first side flap 14 attached to one side of base 12 and second side flap 16 attached to the opposite side of base 12, both in hinged relationship with base 12. Attached to first side flap 14 is first overlap flap 18 and attached to second side flap 16 is second overlap flap 20. Turkey caller 22 is shown in phantom resting on base 12.

Velcro separable fastener strip 24 is attached to the upper side of second overlap flap 20. Velcro separable fastener strip 26 is attached to the under side of first overlap flap 18.

Figure 2:
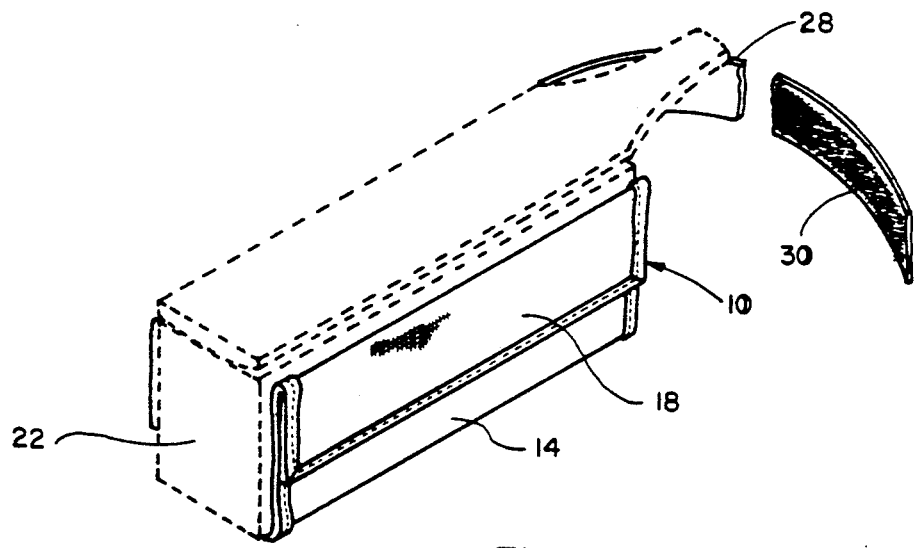
FIG. 2 is a perspective with the respective side flaps and end flaps folded in place.

FIG. 2 shows first side flap 14 in parallel and adjacent relationship with turkey caller 22 and with first overlap flap 18 folded in place in adjacent and parallel relationship with first side flap 14. Also shown in FIG. 2 is elongated strap 28 having Velcro separable fastener strip 30 attached on the inner side of the extension of strap 28 and near the extremity thereof.

Figure 3:
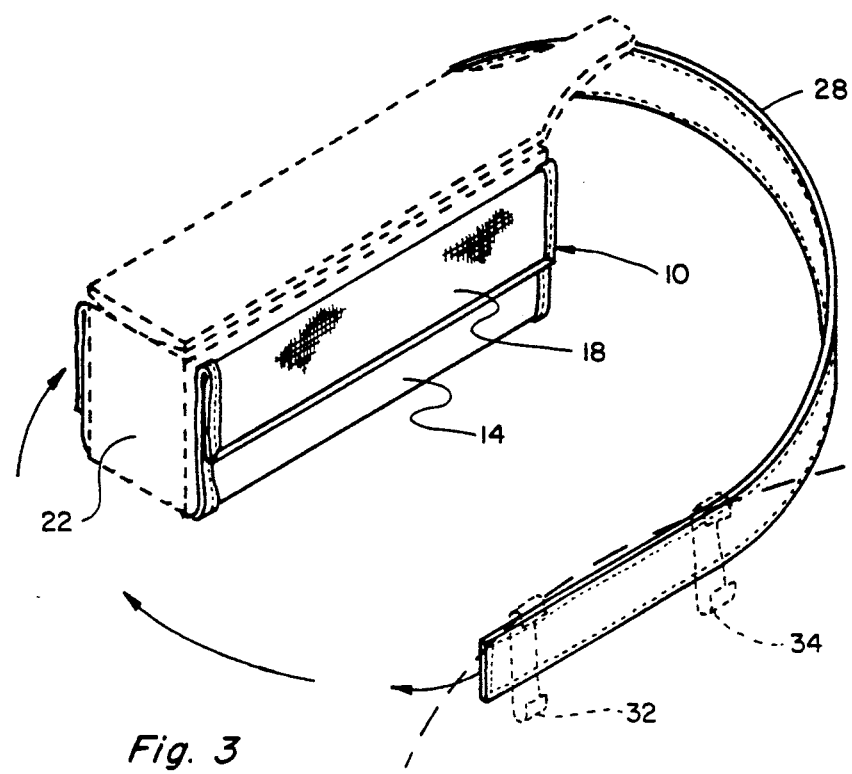
FIG. 3 is a perspective of the container with the turkey caller in place and with the elongated strap.

FIG. 3 shows container 10 with turkey caller 22 in place and ready for service with elongated strap 28 looping through trouser belt loops 32 and 34.

Figure 4:
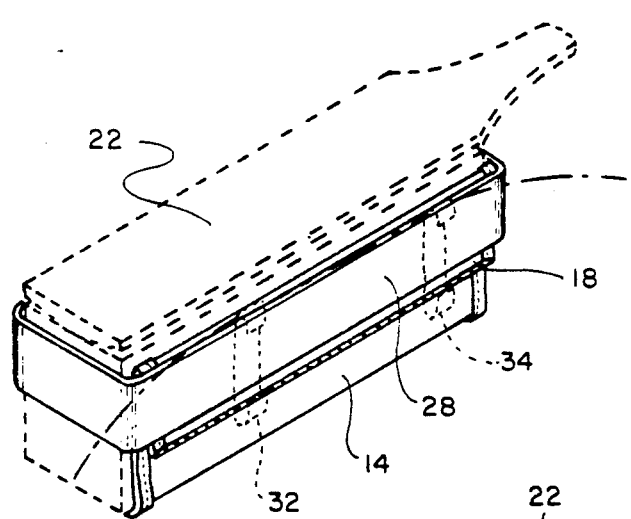
FIG. 4 is a perspective showing the container with the exposed turkey caller in place on a hunter.

FIG. 4 shows turkey caller 22 in container 10 in place on a turkey hunter ready for use in calling a turkey. First side flap 14 is shown in adjacent and parallel relationship with the side of turkey caller 22 and with first overlap flap 18 folded back over first side flap 14. Strap 28 is shown in place through belt loops 32 and 34 and wrapped tightly around the end of turkey caller 22.

Figure 5:
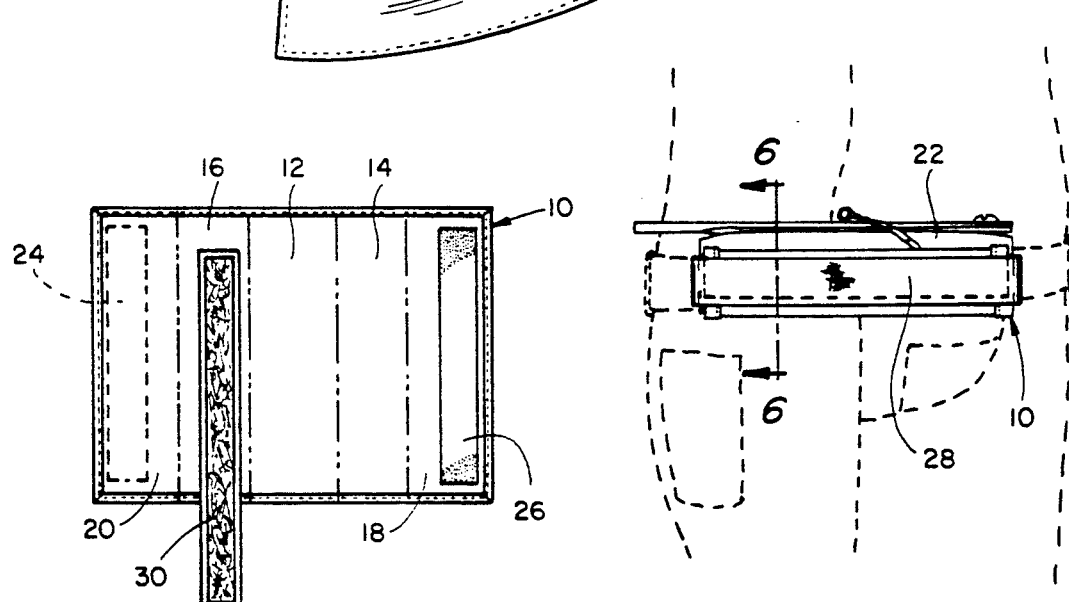
FIG. 5 is a frontal view of a container and turkey caller in place attached on a hunter.

FIG. 5 shows container 10 with turkey caller 22 in place on the front of the turkey hunter.

Figure 6:
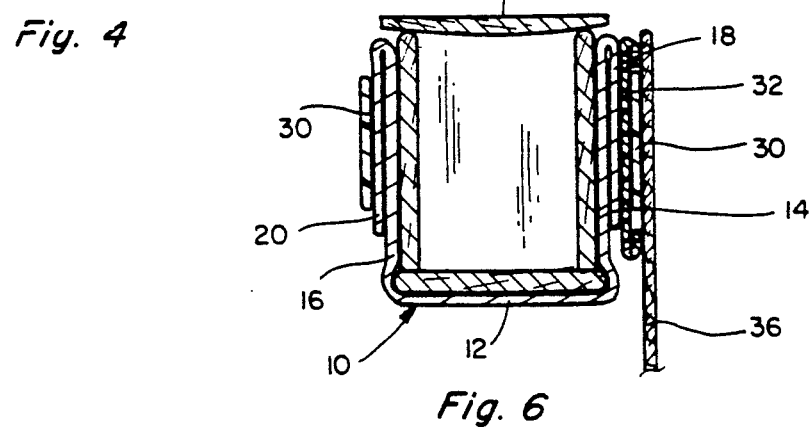
FIG. 6 is a sectional view taken along the line 6—6 of FIG. 5.

FIG. 6 is a section view taken along line 6—6 of FIG. 5. Turkey caller 22 is shown in place in container 10 with the bottom resting on base 12. First side flap 14 is shown in abutting relationship with the outside of turkey caller 22 and with first overlap flap 18 in abutting relationship with first side flap 14. Strap 28 is shown inside belt loop 32 and belt loop 32 is shown attached to trouser 36. On the side of turkey caller 22 opposite the hunter, second side flap 16 is shown in abutting relationship with the outside of turkey caller 22 with second overlap flap reversed and folded into abutting relationship with second side flap 16. Strap 28 is shown on the outside in position to hold turkey caller 22 in place on the hunter for use in calling a turkey.

Figure 7:
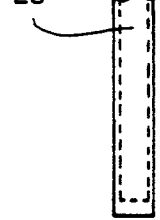
FIG. 7 is a top plan view of the container of this invention when folded out flat; and, FIG. 8 is a perspective of the container in closed position to hold the delicate turkey caller for safe transportation and storage.

FIG. 7 shows a top plan view of container 10. The underside of base 12 is shown with first side flap 14 and second side flap 16 attached thereto in hinged relationship. First overlap flap 18 is shown with Velcro separable fastener strip 26 attached thereto. Second overlap flap 20 is shown attached to second side flap 16 in hinged relationship and showing Velcro strip 24 in phantom attached to the opposite side of second overlap flap 20. Elongated strap 28 is shown in sections. Velcro flexible fastener strip 30 is shown attached to the back of second side flap 16 and extending beyond the edge of second side flap 16.

Figure 8:
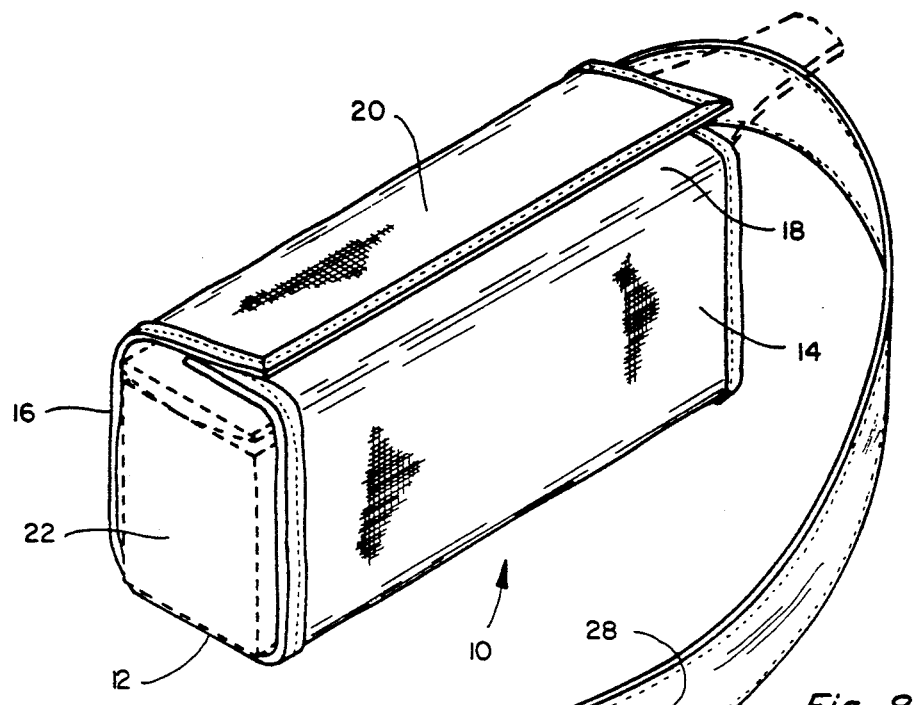

FIG. 8 shows turkey caller 22 encased in container 10 whereby first side flap 14 and second side flap 16 are shown extending upward from base 12 in substantially perpendicular relationship thereto and in adjacent and parallel relationship with turkey caller 22. First overlap flap 18 is shown overlapping the top of turkey talker 22. Second overlap flap 20 is shown overlapping the top of turkey talker 22. First overlap flap 18 and second overlap flap 20 overlap each other and are held in place by Velcro separable fastener strips attached to each respectively, but not shown. Strap 28 is shown in loose relationship with remainder of container 10 but adapted to be wrapped around the remainder of container 10 and turkey caller 22 in order to provide maximum protection for turkey caller 22 while being transported or stored.

EXAMPLE

A container was made for a turkey caller manufactured by M. L. Lynch Co., Liberty, Miss. identified as Model No. 102 and marketed with the trademark WORLD CHAMPION. The wooden box base of this turkey caller is approximately 7½ inches long, 1¾ inches wide and 2 inches high. The WORLD CHAMPION turkey caller is comprised of a resonance box with a pivoted top adapted to scrape back and forth across the top of the Box. The top edges of the resonance box and the bottom of the rotatable top are coated with a powdery material such as a resinous material similar to the resin used on violin bows and strings. A container was made by preparing a double layer of canvas with a resilient material, cotton, between the layers of canvas. The layers of canvas were approximately seven inches wide in order to accommodate the length of the turkey caller to be contained therein. The overall length of the overlapped canvas was about 9¾ inches in order to accommodate the base which was about 2 inches wide, the respective side flaps which were a little over 2 inches wide and the respective overlap flaps which were each approximately 2 inches wide. The overlapped pieces of canvas were held in place by means of a plastic border which was sewed in place about the entire structure. A Velcro separable fastener strip about one inch wide and 6¼ inches long was sewed to the under side of one end of the container blank and a similar Velcro separable fastener strip was sewed to the upper side of the opposite end of the container blank. A strap approximately 1¼ inches wide was made of similar overlapped canvas and sewed to the underside of the overlapped canvas, along with a strip of Velcro separable fastener approximately nine inches long. A similar Velcro separable fastener strip about 12 inches long was sewed to the opposite side of the canvas strip. When the container was completed, the turkey caller was placed on the container, the side flaps and end flaps were wrapped about the turkey caller and the elongated end strap was wrapped around the container with the turkey caller inside to secure the turkey caller for storage and transportation.

To carry the turkey caller on a person, with the container with the turkey caller inside hanging down, the handle strap (with Velcro separable fastener on the handle strap facing away from the body) was run through two belt loops and pulled tight until the container with the turkey caller inside was up to the belt loop. The container with the turkey caller inside was leveled against the body. Thereafter, the handle strap was wrapped tightly around the end of the container and afixed to the Velcro separable fastener on the other side of the container. In order to operate the turkey caller with one hand while on a hunt, the handle strap was loosened slightly and the container with the turkey caller inside was pulled a little away from the body to provide some room. The overlapping end flaps were loosened and each was folded back to form a U-shape or cup around the turkey caller, leaving the turkey caller exposed for instant use. The strap was tightened again and rewrapped around the container, to hold the container and the turkey caller tight against the body, making sure that the inside fold and the outside fold left the upper portion of the turkey caller (the lip) free to operate.

The materials of construction for this invention may be any flexible material adapted to encase a particular turkey caller. Such materials include flexible plastics such as polyolefins, polyamides, acrylic materials and others similar flexible plastic materials, fabrics such as cotton fabrics, wool fabrics, polyester fabrics and any other flexible fabric material and mixtures of flexible fabric materials. A particularly useful material is canvas fabric made from a mixture of polyesters and cotton. The containers of this invention will preferably be multicolored to create a camouflage adapted to blend with the fabrics normally worn by hunters and to blend with the surrounding terrain. Multiple colors of shades of browns and greens are generally used for this purpose.

The turkey caller and container of this invention may be attached to the hunter in any convenient manner, although it is preferable to use a strap. The strap for attaching the container and the turkey caller will preferably be of a length to fit through the two front loops on a conventional pair of trousers and long enough to wrap around the container. If desired, the strap can be of a length sufficient to wrap around the hunter and be constructed in such a manner so as to be lengthened and shortened to adapt to a particular person. Any conventional system for lengthening and shortening the strap may be used such as buttons, snaps or mating Velcro separable fastener strips. Also, loops could be fixed to the container so that a standard belt could be passed through the loops to retain the container in position about the hunter.

Although Velcro separable fastener strips have been used in describing this invantion and are the preferred means for making the various connections relating to this invention, other separable fasteners and other conventional attaching means may be used. For example, the container could be closed by using a series of snaps or a zipper to attach the first overlap flap and the second overlap flap to close the container. By using Velcro strips for the various attachments, the container is more easily adapted to accommodate different sized turkey callers. Also, the dimensions may be changed to accommodate various turkey callers which may vary in size and shape.

Velcro is a registered trademark of Velcro USA Inc., Manchester, N.H., for separable fasteners—namely, hook and loop type fasteners and components thereof. This invention has been described using Velcro separable fasteners, which is the preferred fastening material. However, other separable fasteners and other means of attachment such as zippers, snaps, and any other conventional attaching means are considered to be within the scope of this invention.

Thus there has been shown and described novel means for a turkey caller carrier. The present invention fulfills all the objects and advantages set forth above. It will be apparent to those skilled in the art, however, that many changes, modifications, variations and other uses and applications for the subject invention are possible. All such changes, modifications, variations and other uses and applications which do not depart from the spirit and scope of the invention are deemed to be covered by the invention, which is limited only the claims which follow.

What is claimed is:

1. A container for turkey callers comprised of a body of flexible material with a first end portion and a second end portion, said first end portion and said second end portion being adapted to overlap to close said container and each of said first end portion and said second end portion being adapted to be folded back to expose said turkey caller for use, said container adapted to retain a turkey caller in place without inhibiting the operation of said turkey caller, said container having means attached thereto for holding said container with said turkey caller in place on the body of a turkey hunter whereby said turkey hunter can utilize said turkey caller without removing said turkey caller from said container containing said turkey caller, wherein said body of flexible material is comprised of overlapping canvas layers with a padding material between said overlapping layers said overlapping canvas layers being held in place with an edging, and wherein at least the outer layer of said overlapping layers is comprised of multi-colored camouflage canvas.

* * * * *